United States Patent [19]
Loftus et al.

[11] Patent Number: 5,595,584
[45] Date of Patent: Jan. 21, 1997

[54] METHOD OF ALTERNATE COMMINGLING OF MINERAL FIBERS AND ORGANIC FIBERS

[75] Inventors: James E. Loftus; Michael T. Pellegrin, both of Newark, Ohio

[73] Assignee: Owens Corning Fiberglas Technology, Inc., Summit, Ill.

[21] Appl. No.: 367,034

[22] Filed: Dec. 29, 1994

[51] Int. Cl.$^6$ .............................. C03C 14/00; C03B 37/04
[52] U.S. Cl. .................. 65/442; 65/459; 65/460; 65/470; 264/8; 264/122; 264/211.1; 264/211.12; 264/173.1
[58] Field of Search ............................. 65/442, 455, 459, 65/460, 469, 470, 516, 517, 521; 264/8, 115, 121, 122

[56] References Cited

U.S. PATENT DOCUMENTS

| 2,278,895 | 4/1942 | Rugeley et al. . |
| 2,399,260 | 4/1946 | Taylor . |
| 2,731,066 | 1/1956 | Hogendobler et al. . |
| 2,778,763 | 1/1957 | Novack . |
| 2,888,060 | 5/1959 | Kjell-Berger ................ 65/469 X |
| 3,016,599 | 1/1962 | Perry, Jr. . |
| 3,022,538 | 2/1962 | Setterberg . |
| 3,050,427 | 8/1962 | Slayter et al. . |
| 3,134,704 | 5/1964 | Modigliani . |
| 3,511,747 | 8/1968 | Davies . |
| 3,684,415 | 8/1972 | Buntin et al. . |
| 3,877,911 | 4/1975 | Borst . |
| 4,147,574 | 4/1979 | Setsuie et al. . |
| 4,201,247 | 5/1980 | Shannon ........................... 65/442 X |
| 4,224,373 | 9/1980 | Marzocchi . |
| 4,277,436 | 7/1981 | Shah et al. . |
| 4,359,444 | 11/1982 | Shah et al. . |
| 4,414,276 | 11/1983 | Kiriyama et al. . |
| 4,552,603 | 11/1985 | Harris, Jr. et al. . |
| 4,568,506 | 2/1986 | Kiriyama et al. . |
| 4,632,685 | 12/1986 | Debouzie et al. .................. 65/517 |
| 4,871,491 | 10/1989 | McMahon et al. . |
| 5,011,523 | 4/1991 | Boncato et al. . |
| 5,057,168 | 10/1991 | Müncrief . |
| 5,100,435 | 3/1992 | Onwumere . |
| 5,123,949 | 6/1992 | Thiessen . |
| 5,232,638 | 8/1993 | Thiessen et al. . |
| 5,458,822 | 10/1995 | Bakhshi et al. ................ 65/455 X |

FOREIGN PATENT DOCUMENTS

| 0530843 | 3/1993 | European Pat. Off. . |
| 0329118 | 3/1993 | European Pat. Off. . |
| 0371613 | 3/1993 | European Pat. Off. . |

*Primary Examiner*—James Engel
*Assistant Examiner*—M. Curtis Mayes
*Attorney, Agent, or Firm*—C. Michael Gegenheimer; Curtis B. Brueske

[57] ABSTRACT

A method for producing mineral fibers includes centrifuging mineral fibers from one or more rotary mineral fiber spinners to establish one or more downwardly moving veils of mineral fibers positioned above a collecting surface, centrifuging organic fibers from molten organic material using one or more rotary organic fiber spinners to establish one or more downwardly moving veils of organic fibers positioned above the collecting surface, the veils of mineral fibers being generally colinear with the veils of organic fibers, the veils of organic fibers alternating with the veils of mineral fibers to integrate the organic material and the mineral fibers, and collecting the integrated organic material and mineral fibers on the collecting surface.

20 Claims, 4 Drawing Sheets

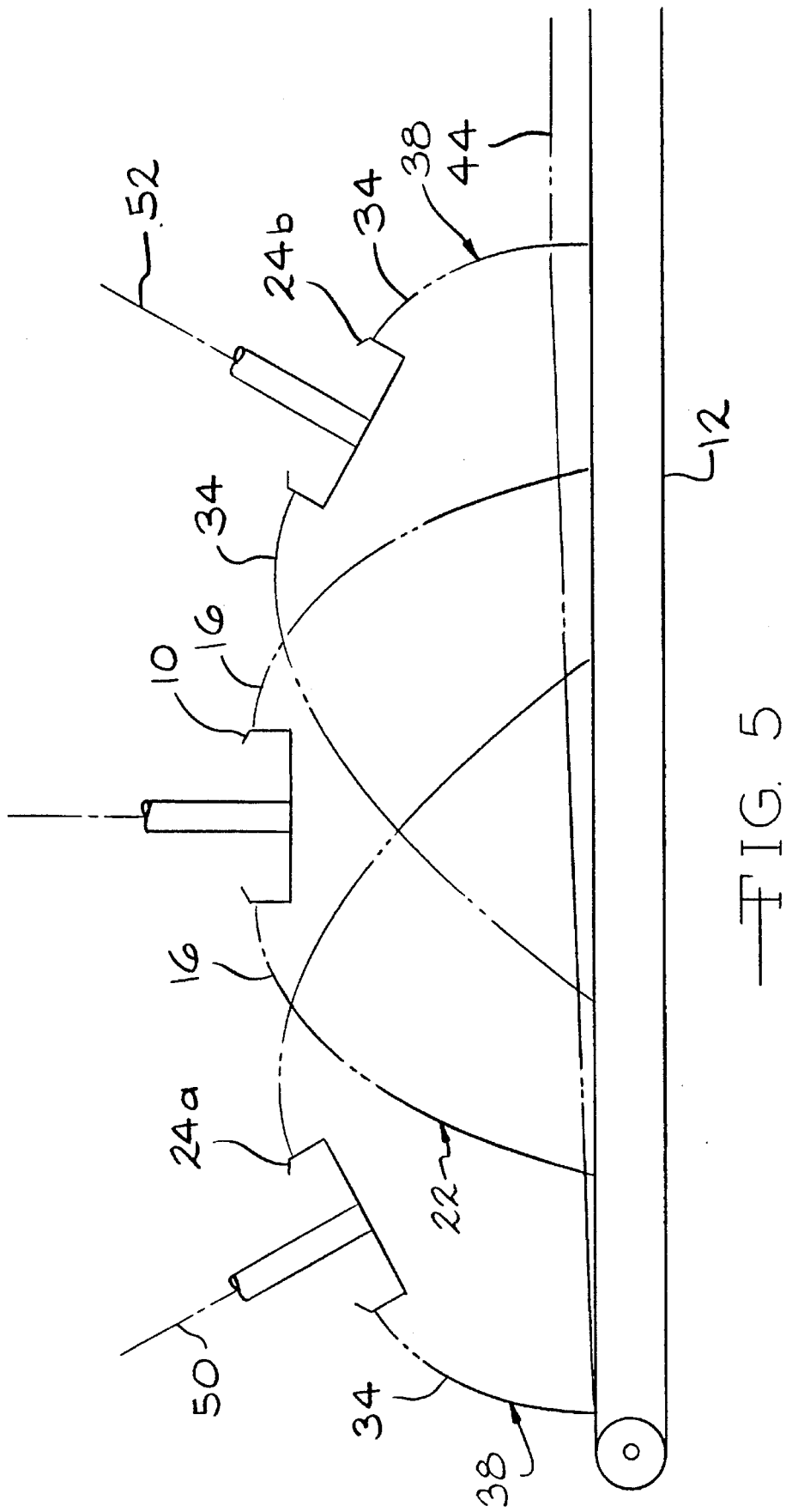

METHOD OF ALTERNATE COMMINGLING OF MINERAL FIBERS AND ORGANIC FIBERS

TECHNICAL FIELD

This invention relates to the production of mineral fiber products and, in particular, mineral fiber products having an organic or polymer applied thereto. More particularly, this invention relates to making a mineral fiber product with a novel way of applying polymeric material to the mineral fibers.

BACKGROUND

Mineral fiber products, particularly products made of glass fibers, are typically made as either continuous fibers or discontinuous fibers. Various organic coatings are applied to these fibers for protecting the fibers from abrasion, for connecting the mineral fibers to each other to form a structural product, and for providing compatibility of the mineral fibers with other materials, such as the compatibility between reinforcement fibers and a plastic matrix. In the case of insulation products, the mineral fibers are bonded together by organic material, such as a phenol/formaldehyde binder, to form a spring-like matrix which can recover after compression during packaging.

The application of organic material to the mineral fibers can take several forms. Continuous mineral fibers can be run through a bath or across a coater to apply a coating to the fibers, such as during the application of a size to continuous fibers. Also, the organic material can be sprayed onto the mineral fibers. This method is commonly used in the manufacture of insulation products where downwardly moving a cylindrical veil of mineral fibers is met with the sprays of the phenol/formaldehyde binder. Typically, the phenol/formaldehyde binder contains urea, and has a molecular weight of around 600 in the uncured state in the aqueous solution being applied to the glass fibers.

One of the problems with applying aqueous organic binders of the prior art to cylindrical veils of mineral fibers is that a portion of the binder tends to evaporate prior to contact between the liquid binder drop and a mineral fiber in the veil. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect.

Another problem associated with the application of binder to insulation products is that the low molecular weight phenol/formaldehyde binder material does not have some of the desirable characteristics of other, higher molecular weight polymeric material, such as polyethylene terephthalate (PET), polypropylene, or polyphenylene sulfide (PPS). A primary problem with the low molecular weight binder material is that a curing process is required, and this usually has operating penalties such as the capital and operating cost of a curing oven, the cost of handling pollution problems, degree of cure problems and product integrity problems. If higher molecular weight polymers could be applied to mineral fibers to produce insulation products, some improved features and efficiencies could be realized.

A method recently developed for applying higher molecular weight binders to mineral fibers to produce an insulation product includes the use of two coaxial rotary spinners, an upper spinner for fiberizing glass fibers from molten glass, and a coaxial lower spinner for fiberizing organic material. The glass fibers are directed into a downwardly moving cylindrical veil, and the spinner for the organic fibers is positioned within the veil. The organic fibers are directed radially into contact with the glass fibers, where some of the organic fibers melt and form a coating or binder on the glass fibers. Some of the organic fibers retain their fibrous form. The resulting product exhibits excellent molding properties for insulation and structural glass fiber products. The above-described cofiberizing technology is the subject of U.S. Pat. Nos. 5,458,822 and 5,490,961, both of which are assigned to the assignee of the present invention, and both of which are hereby incorporated by reference.

A problem with the above-described cofiberizing process is that the use of coaxial spinners dictates narrow operating windows on both the glass fiberizing process and the organic fiberizing process. The temperature of the environment surrounding the glass fiber spinner must be tailored to accommodate the temperature limitations of the organic material. Degradation of the organic material is more pronounced at higher percentages of organic material than when only low percentages of organic material is used. It would be advantageous to have a process for integrating organic material, in either fibrous or non-fibrous form, into a veil or stream of mineral fibers without requiring the use of coaxial spinners.

DISCLOSURE OF INVENTION

There is now been developed a method for manufacturing a mineral fiber product which includes the step of directing fibers of organic material toward a stream of mineral fibers into entanglement with the mineral fibers. The mineral fibers are centrifuged from a first spinner, such as a glass fiber spinner, and the organic fibers are produced by a second spinner, which is an organic fiber spinner, which is positioned adjacent to but not coaxial with the glass spinner. The mineral fiber spinners and the organic fiber spinners are positioned colinerly, either in the machine direction or in the cross-machine direction. Process efficiencies can be realized by commingling the mineral fibers and organic fibers from alternate rotary fiberizers. One such efficiency is that existing mineral fiber and polymer fiber rotary fiberizers can be used. Another benefit is an improved ability to change spinners when they reach their useful life. Further, by decoupling the mineral fiberizing from the organic fiberizing, the operating windows for both the mineral fiberizing process and the organic fiberizing process can be opened up. Another advantage of the invention is that the inherent layering of different materials from the alternate fiberizers enables the manufacture of different layered products.

According to this invention, there is provided a method for producing mineral fibers comprising centrifuging mineral fibers from one or more rotary mineral fiber spinners to establish one or more downwardly moving veils of mineral fibers positioned above a collecting surface, centrifuging organic fibers from one or more rotary organic fiber spinners to establish one or more downwardly moving veils of organic fibers positioned above the collecting surface, the veils of organic fibers alternating with the veils of mineral fibers along the length of the collecting surface to integrate the organic fibers and the mineral fibers, and collecting the integrated organic material and mineral fibers on the collecting surface. Preferably, the veils of organic fibers and the veils of mineral fibers are aligned generally along the length of the collecting surface.

In a specific embodiment of the invention, the mineral fibers are glass fibers.

In one embodiment of the invention, the centrifuging of the mineral fibers results in the presence of hot gases in the veil of mineral fibers, and the organic fibers are directed into contact with the mineral fiber veil so that some of the organic fibers become softened to the extent that they lose their fibrous form and become attached to the mineral fibers as organic, non-fibrous particles, whereas some of the organic fibers retain their fibrous form.

In a preferred embodiment of the invention the organic material is a polymeric material, most preferably polyethylene terephthalate (PET), polypropylene or polyphenylene sulfide (PPS).

In a specific embodiment of the invention, three spinners are used, one organic fiber spinner and two mineral fiber spinners, all three spinners being colinear along the length of the collecting surface.

In yet another embodiment of the invention, at least one organic fiber spinner is positioned downstream from all the mineral fiber spinners along the length of the collecting surface. This ensures that the top layer of the product will contain a high percentage of the organic material. During a further fabrication step the product can be contacted with a heated surface, such as a heated calendaring roll, to melt or soften the organic-rich surface and thereby provide a smooth surface or skin.

In another embodiment of the invention, at least one of the organic spinners is rotating on a tilted axis different from the axis of rotation of the mineral fiber spinner, with the tilted axis being oriented toward the veil of mineral fibers to direct the organic fibers into contact with the mineral fibers.

BRIEF DESCRIPTION OF DRAWINGS

FIG. 5 is a schematic view in elevation of two polymer fiber spinners and one glass fiber spinner of the invention, with the two polymer fiber spinners having tilted axes oriented toward the veil of mineral fibers to direct the polymer fibers into contact with the mineral fibers.

BEST MODE FOR CARRYING OUT THE INVENTION

The invention will be described in terms of a glass fiber forming operation, although it is to be understood that the invention can be practiced using other heat softenable mineral material, such as rock, slag, and basalt.

It is to be understood that any organic material capable of being fiberized can be supplied to the apparatus used with the invention. The preferred organic material is a polymer material. Particularly useful examples of polymers include such higher molecular weight polymeric material as polyethylene terephthalate (PET), polypropylene or polyphenylene sulfide (PPS). Other organic materials possibly suitable for fiberization include nylon, polycarbonate, polystyrene, polyamide, resins, various polyolefins, asphalts and other thermoplastic and thermoset materials.

Figure 1:
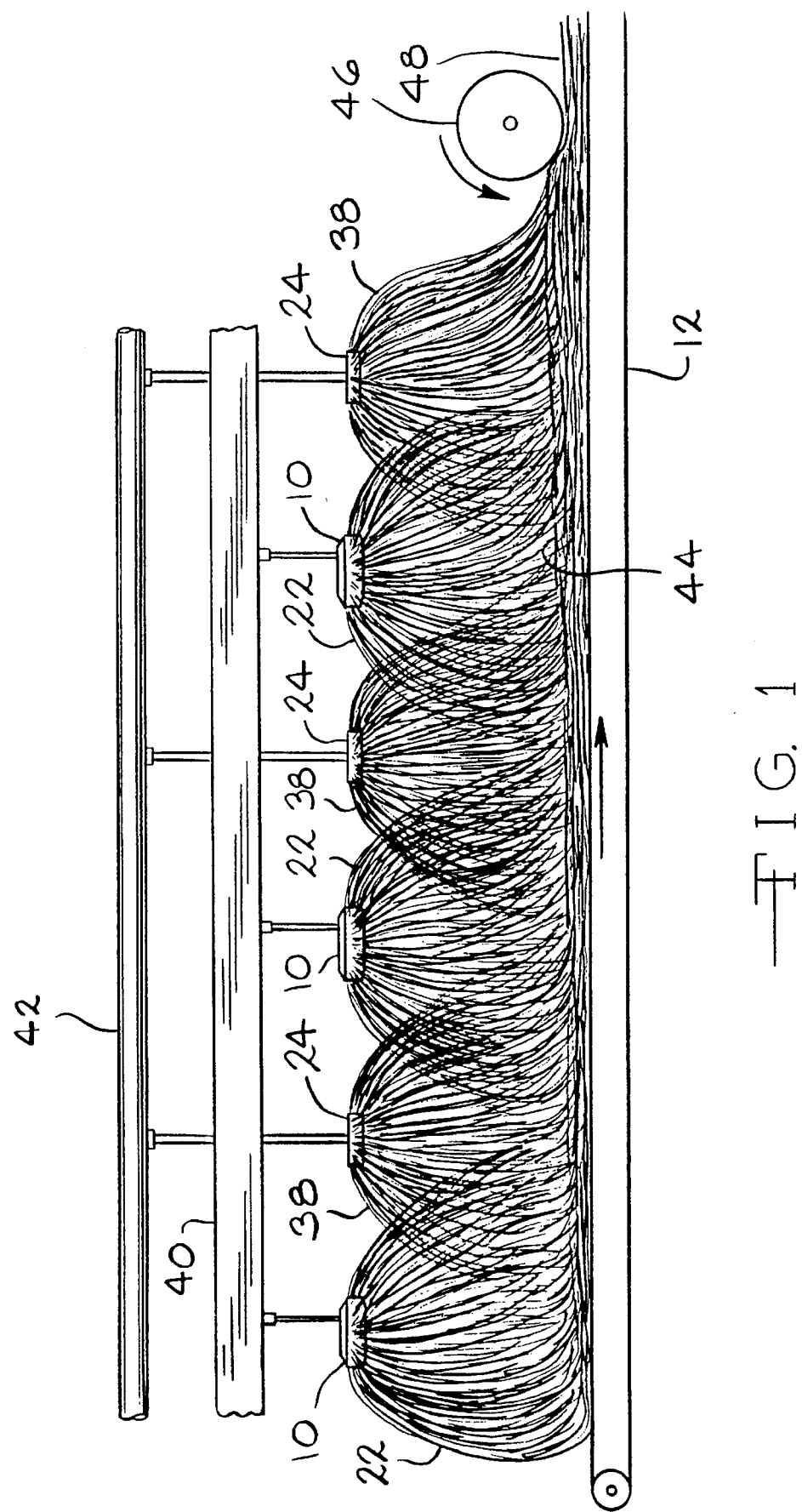
FIG. 1 is a schematic view in elevation of alternate glass fiber spinners and organic fiber spinners for producing mineral fibers according to the method of the invention.
Figure 2:
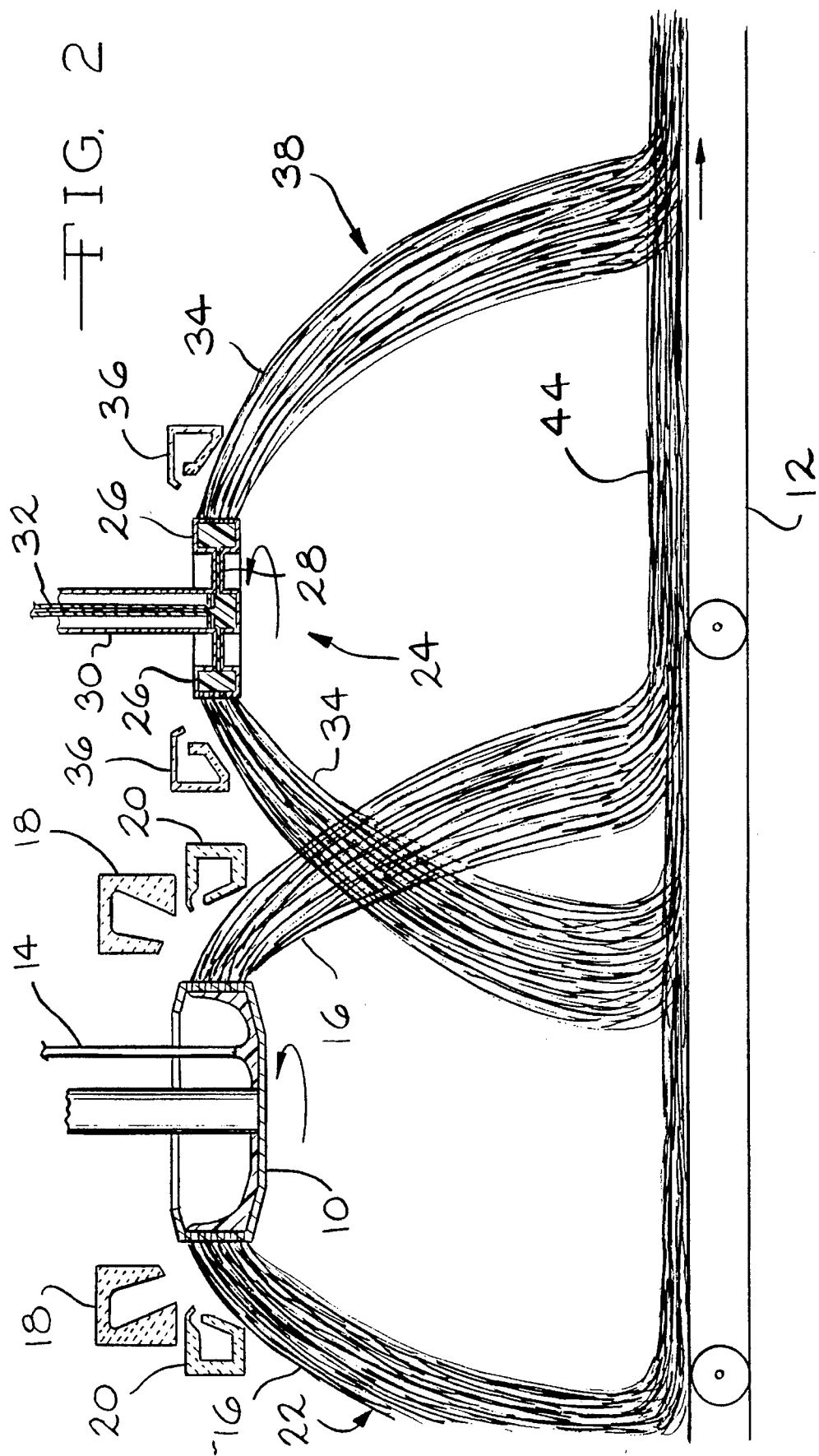
FIG. 2 is a schematic cross-sectional view in elevation illustrating in greater detail of two of the fiberizers shown in FIG. 1.

As shown in FIGS. 1 and 2, a plurality of rotary mineral fiber spinners, such as glass fiber spinners 10, are arranged above a collecting surface, such as conveyor 12. The glass fiber spinners can be any device suitable for the rotary centrifugation of glass fibers from molten glass. Examples of rotary fiberizers are well known in the art. A stream of molten glass 14 is dropped onto the bottom of the glass fiber spinner, and the molten glass is centrifuged through the orificed spinner peripheral wall to form glass fibers 16. The glass fiber spinner can be cast from a nickel/cobalt/chromium alloy as is known in the art. The glass fiber spinners can be equipped with an annular burner 18 to facilitate the fiberizing process, although in some glass fiber operations an external burner is not required. An annular blower 20 can also be used to turn the glass fibers downward to form a downwardly moving column of glass fibers and hot gasses, such as glass fiber veil 22.

A plurality of rotary organic fiber spinners, such as polymer fiber spinners 24, are also arranged above the conveyor. The spinners can be similar to conventionally used spinners for fiberizing glass, or can alternatively be comprised of a plurality of rotating polymer distributing devices, such as nozzles 26. The nozzles can be disposed at the ends of a plurality of delivery conduits, such as pipes 28. The polymer fiber spinner is rotated by spindle 30, and stream 32 of molten organic material, such as polymer material, is delivered to the polymer fiber spinner. The molten polymer material is fed through the pipes to the nozzles and centrifuged into polymer fibers 34. An annular blower 36 can be positioned around the polymer fiber spinner to turn the polymer fibers into a downwardly moving veil 38 of polymer fibers.

As can be seen in FIG. 1, the molten glass can be delivered to the glass fiber spinners via molten glass forehearth 40. Also, the molten polymer material can be delivered to the polymer fiber spinners by any suitable device, such as molten polymer conduit 42.

The glass fiber veils 22 and the polymer fiber veils 38 overlap, thereby commingling or integrating the glass fibers 16 and polymer fibers 34. The polymer fibers can be of any size, but preferably have diameters within the range of from about 20 to about 150 hundred thousandths of an inch (Ht). The integrated glass fibers and polymer fibers are collected on the conveyor as an integrated mass 44 of polymeric material and glass fibers. In a subsequent step, the integrated mass of glass fibers and polymer material can be treated with a heating device, such as heated calendaring roll 46 to produce a consolidated product, such as pressed molding sheet 48. The molding sheet can be used as input stock for molding operations, such as for a glass wool molding operation for producing automobile headliners.

As can be seen in FIG. 1, the glass fiber spinners 10 are colinear with the polymer fiber spinners 24, along the length of the conveyor. The veils 22 of glass fibers alternate with the veils 38 of polymer fibers to provide the maximum amount of intermingling between the glass fibers and the polymer fibers. It is to be understood that the term "alternating" also includes configurations of glass fiber spinners and polymer fiber spinners in which two of the glass fiber spinners are followed by two of the polymer fiber spinners, because the intermingling of the glass fibers and the polymer fibers can still take place.

The heat of the hot gases may cause some of the polymer fibers coming into contact with the veil to become softened to the extent that they lose their fibrous form and become attached to the mineral fibers. Since the glass fiber spinners operate at a temperature of around 1,700° F., the polymer fibers are rapidly thrust into a region of high temperature, causing the polymer fibers to soften. Under certain conditions some of polymer fibers will melt, forming droplets or other particles which attach themselves to some of the mineral fibers. Others of the polymer fibers retain their fibrous shape, resulting in the presence of polymer fibers on the conveyor. It is possible that all of the polymer fibers would melt or otherwise deform so that they are no longer in a fibrous form. Therefore, what is collected on the conveyor may be not just glass fibers and polymer fibers, but rather may be glass fibers and polymer material.

The reason that some of polymeric material retains its fibrous shape, while other portions of the material form polymeric particles which attach themselves to the mineral fibers is not known. It may be that some of the polymer fibers do not soften to the extent required to cause them to lose their fibrous shape and turn into a more spherical shape. Alternatively, it may be that although all polymer fibers are softened, only a portion of them come into contact with mineral fibers while in a softened condition.

Figure 3:
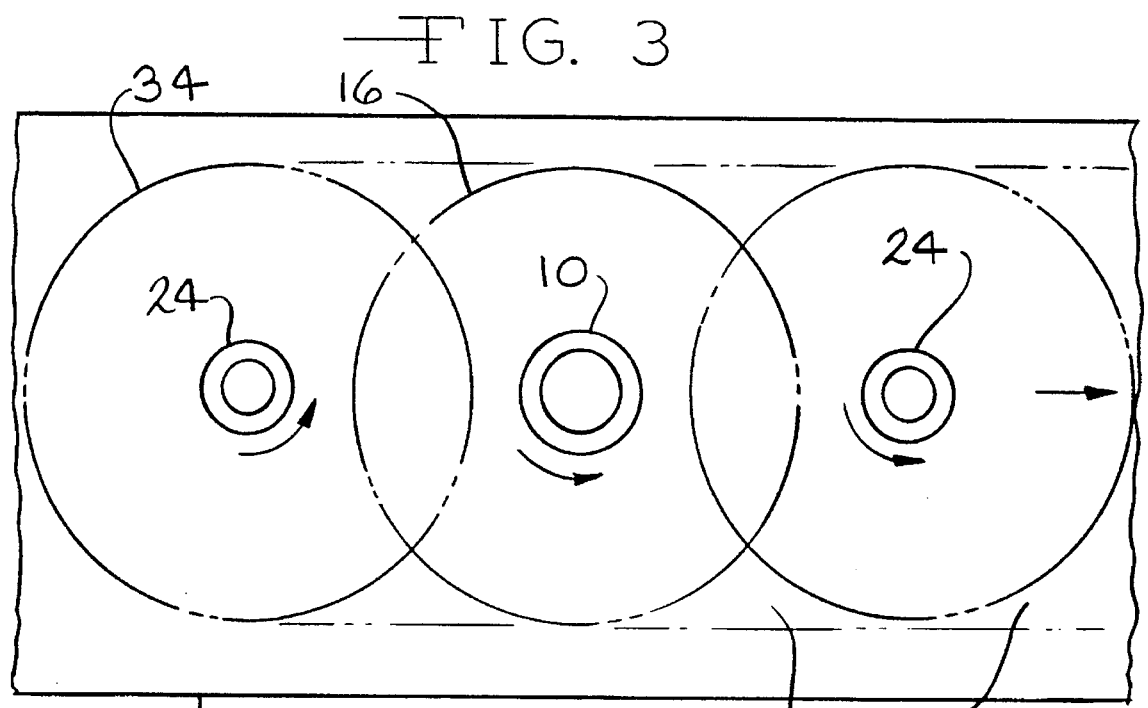
FIG. 3 is a schematic plan view of polymer fiber spinners and a glass fiber spinner arranged along the length of the collecting surface.

As shown in FIG. 3, in a specific embodiment of the invention, the glass fiber spinner 10 is positioned between two polymer spinners 24. They are aligned colinerly, generally along the length of the conveyor.

Figure 4:
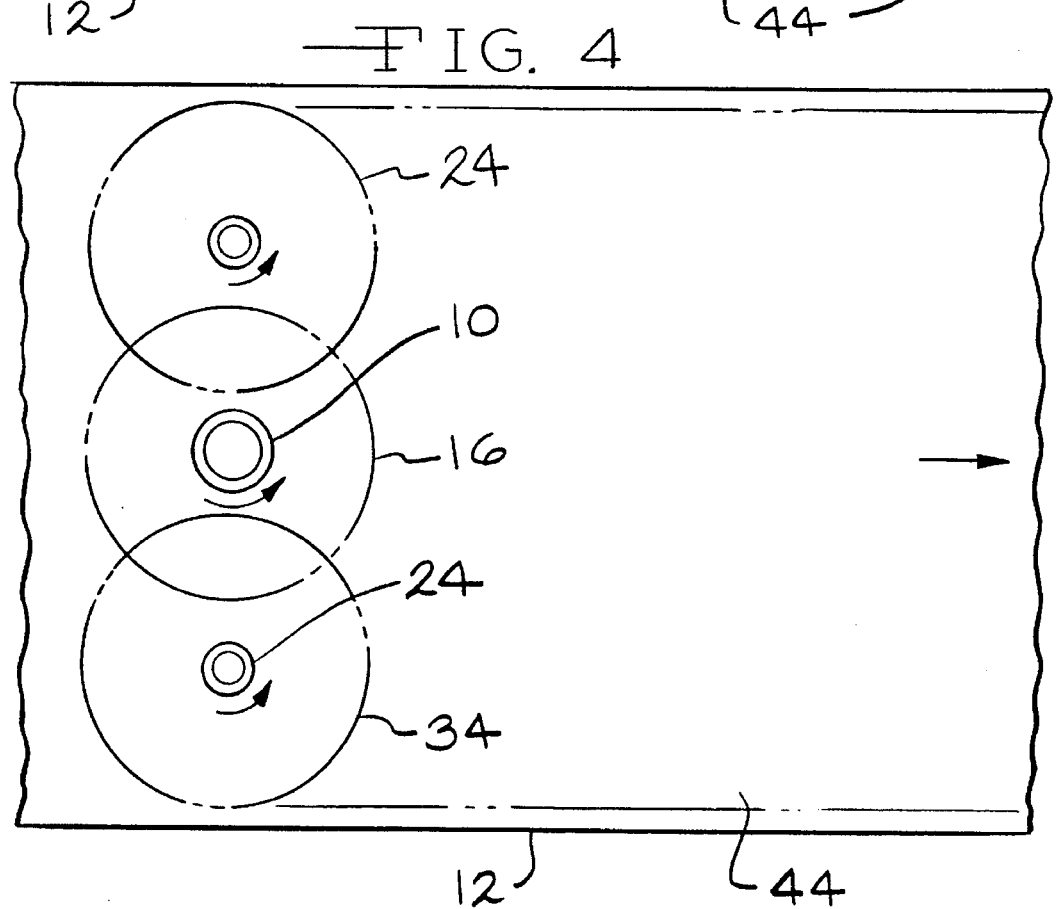
FIG. 4 is a schematic plan view of two polymer fiber spinners and one glass fiber spinner of the invention, arranged transverse to the length of the collecting surface.

As shown in FIG. 4, in an alternate embodiment, the glass fiber spinner and two polymer spinners are aligned colinerly, but in a direction transverse to the machine direction, i.e., transverse to the length of the collecting surface.

The organic fiber spinners can be mounted in a tilted configuration, as shown in FIG. 5, to increase the amount of intermingling of the glass fibers and the polymer fibers. The polymer fiber spinners 24a and 24b are rotating on axes 50 and 52, respectively, each of which is different from, and at an angle to, the axis 54 of the glass fiber spinner. By tilting the axes 50 and 52 so that they are oriented toward the veil 22 of glass fibers, the integration of the glass fibers and the polymer fibers is enhanced.

It is to be understood that any number of polymer fiber spinners and glass fiber spinners can be used in embodiments similar to those shown in FIGS. 3–5.

It will be evident from the foregoing that various modifications can be made to this invention. Such, however, are considered as being within the scope of the invention.

INDUSTRIAL APPLICABILITY

The invention can be useful making glass fiber molding media for molded wool structural products, such as headliners and pipe insulation.

We claim:

1. A method for producing mineral fibers comprising:
   a. centrifuging mineral fibers from one or more rotary mineral fiber spinners to establish one or more downwardly moving veils of mineral fibers positioned above a collecting surface;
   b. centrifuging organic fibers from molten organic material using one or more rotary organic fiber spinners, to establish one or more downwardly moving veils of organic fibers positioned above the collecting surface, the veils of mineral fibers being generally colinear with the veils of organic fibers, where the rotary mineral fiber spinners and the rotary organic fiber spinners are arranged so that they are not coaxial and so that there is an overlapping of at least one of the veils of organic fibers with at least one of the veils of mineral fibers to integrate the organic material and the mineral fibers; and,
   c. collecting the integrated organic material and mineral fibers on the collecting surface.

2. The method of claim 1 in which the centrifuging of the mineral fibers results in the presence of hot gases in the veil of mineral fibers, and further comprising directing the organic fibers into contact with the mineral fiber veil so that some of the organic fibers become softened to the extent that they lose their fibrous form and become attached to the mineral fibers as organic, non-fibrous particles, whereas some of the organic fibers retain their fibrous form.

3. The method of claim 1 in which the organic material is a polymeric material.

4. The method of claim 1 in which the diameter of the organic fibers within the veil of organic fibers is within the range of from about 20 to about 150 hundred thousandths of an inch.

5. The method of claim 1 in which at least one of the organic fiber spinners is rotating on a tilted axis different from the axis of rotation of one of the mineral fiber spinners, the tilted axis being oriented toward the veil of mineral fibers to direct the organic fibers into contact with the mineral fibers.

6. The method of claim 1 including compressing the integrated organic material and mineral fibers with a heated calendaring roll.

7. A method for producing glass fibers comprising:
   a. centrifuging glass fibers from one or more rotary glass fiber spinners to establish one or more downwardly moving veils of glass fibers positioned above a collecting surface;
   b. centrifuging organic fibers from one or more rotary organic fiber spinners to establish one or more downwardly moving veils of organic fibers positioned above the collecting surface, where the rotary glass fiber spinners and the rotary organic fiber spinners are arranged so that they are not coaxial and so that there is an overlapping of at least one of the veils of organic fibers with at least one of the veils of glass fibers to integrate the organic material and the glass fibers; and,
   c. collecting the integrated organic material and glass fibers on the collecting surface.

8. The method of claim 7 in which the centrifuging of the glass fibers results in the presence of hot gases in the veil of glass fibers, and further comprising directing the organic fibers into contact with the glass fiber veil so that some of the organic fibers become softened to the extent that they lose their fibrous form and become attached to the glass fibers as organic, non-fibrous particles, whereas some of the organic fibers retain their fibrous form.

9. The method of claim 7 in which the organic material is a polymeric material.

10. The method of claim 7 in which the diameter of the organic fibers within the veil of organic fibers is within the range of from about 20 to about 150 hundred thousandths of an inch.

11. The method of claim 7 in which at least one of the organic fiber spinners is rotating on a tilted axis different from the axis of rotation of one of the glass fiber spinners, the tilted axis being oriented toward the veil of glass fibers to direct the organic fibers into contact with the glass fibers.

12. A method for producing mineral fibers comprising:
  a. centrifuging mineral fibers from one or more rotary mineral fiber spinners to establish one or more downwardly moving veils of mineral fibers positioned above a collecting surface;
  b. centrifuging organic fibers from molten organic material using one or more rotary organic fiber spinners to establish one or more downwardly moving veils of organic fibers positioned above the collecting surface, the veils of mineral fibers being generally colinear with the veils of organic fibers, where the rotary mineral fiber spinners and the rotary organic fiber spinners are arranged generally along the length of the collecting surface so that there is an overlapping of at least one of the veils of organic fibers with at least one of the veils of mineral fibers to integrate the organic material and the mineral fibers; and,
  c. collecting the integrated organic material and mineral fibers on the collecting surface.

13. The method of claim 12 comprising positioning at least one organic fiber spinner downstream from all the fiber mineral spinners along the length of the collecting surface.

14. The method of claim 12 comprising one mineral fiber spinner and two organic fiber spinners, all three spinners being colinear along the length of the collecting surface.

15. The method of claim 14 in which at least one of the organic spinners is rotating on a tilted axis different from the axis of rotation of the mineral fiber spinner, the tilted axis being oriented toward the veil of mineral fibers to direct the organic fibers into contact with the mineral fibers.

16. The method of claim 12 in which the mineral fibers are glass fibers.

17. The method of claim 16 comprising positioning at least one organic fiber spinner downstream from all the glass fiber spinners along the length of the collecting surface.

18. The method of claim 16 comprising one mineral spinner and two organic spinners, all three spinners being colinear along the length of the collecting surface.

19. The method of claim 18 in which at least one of the two organic fiber spinners is rotating on a tilted axis different from the axis of rotation of the glass fiber spinner, the tilted axis being oriented toward the veil of glass fibers to direct the organic fibers into contact with the glass fibers.

20. A method for producing glass fibers comprising:
  a. centrifuging glass fibers from one or more rotary glass fiber spinners to establish one or more downwardly moving veils of glass fibers positioned above a collecting surface, the veils of glass fibers being aligned generally along the length of the collecting surface, and the centrifuging of the glass fibers resulting in the presence of hot gases in the veil of glass fibers;
  b. centrifuging organic fibers from one or more rotary organic fiber spinners to establish one or more downwardly moving veils of organic fibers positioned above the collecting surface, the veils of organic fibers being aligned generally along the length of the collecting surface, where the rotary glass fiber spinners and the rotary organic fiber spinners are arranged so that they are not coaxial and so that there is an overlapping of at least one of the veils of organic fibers with at least one of the veils of glass fibers along the length of the collecting surface to integrate the organic fibers and the glass fibers,
  c. directing the organic fibers into contact with the glass fiber veil so that some of the organic fibers become softened to the extent that they lose their fibrous form and become attached to the glass fibers as organic, non-fibrous particles, whereas some of the organic fibers retain their fibrous form; and,
  d. collecting the integrated organic material and glass fibers on the collecting surface.

\* \* \* \* \*